Feb. 22, 1966 S. KRASNOW 3,237,034

MULTI-VOLTAGE HIGH FREQUENCY GENERATOR

Original Filed Oct. 8, 1956 2 Sheets-Sheet 1

INVENTOR.

BY SHELLEY KRASNOW

Feb. 22, 1966 S. KRASNOW 3,237,034
MULTI-VOLTAGE HIGH FREQUENCY GENERATOR
Original Filed Oct. 8, 1956 2 Sheets-Sheet 2

INVENTOR
Shelley Krasnow

United States Patent Office 3,237,034

Patented Feb. 22, 1966

3,237,034
MULTI-VOLTAGE HIGH FREQUENCY GENERATOR

Shelley Krasnow, Fairfax, Va.
(315 Tudor Lane, Manassas, Va.)

Original application Oct. 8, 1956, Ser. No. 614,599, now Patent No. 3,083,311, dated Mar. 26, 1963. Divided and this application Dec. 21, 1962, Ser. No. 246,879
4 Claims. (Cl. 310—198)

This is a division of application Serial No. 614,599, filed October 8, 1956 now Patent No. 3,083,311.

This invention relates to dynamo-electric machines and the circuits to be used therewith. There will be described herein a particular type of structure and a circuit to be used in conjunction with such structure for high frequency fluorescent lighting.

Use of frequencies above 60 cycles with the conventional type of fluorescent lamp has been found to yield markedly superior results in operation and in life of lamps. Frequencies of 360 and 400 cycles have been used for this purpose. However, as is recognized in this art, frequencies above 400 cycles yield even superior results. Although the principles of construction of the machine to be described herein and of the circuit for use therewith, will not be altered by the frequency, the particular example chosen for illustration herein will be designed to operate at 840 cycles.

As will be obvious to those skilled in this art, many of the features of construction of the dynamo-electric machine will be appropriate and applicable to other similar structures such as motors, magnetos, electrically or magnetically operated clutches, servo-systems, etc.

It is one purpose of the invention to provide a compact unitary efficient structure for the conversion of low frequencies such as 25, 50 or 60 cycles to higher frequencies.

It is a further purpose of the invention to provide a highly efficient magnetic structure for the rotor of a dynamo-electric machine and to provide such structure and associated stator to deliver a wave form with a high percentage of harmonic components, suitable for use by high frequency fluorescent lighting systems.

It is a further purpose of the invention to provide a mechanically strong rotor structure designed to withstand high rotational speeds.

It is a further purpose of the invention to provide a stator structure for use in conjunction with the improved rotor described in order to provide a convenient means of obtaining the desired frequency, harmonics and voltage.

It is a further purpose of the invention to provide an armature winding in which the voltage stress between adjacent conductors used therein will be reduced to a minimum and will thus avoid danger of breakdown.

It is a further purpose of the invention to provide an external circuit especially matched to the properties of the converter to be described so as to obtain superior results for the converter and circuit combination.

It is a further purpose of the invention to provide a circuit associated with the converter to be described, which will maintain a relatively constant voltage for all conditions of load, without the use of any regulating equipment.

It is a further purpose of the invention to permit the use of a converter of the general type described in conjunction with a load of high leading power factor, without the necessity for complex regulating devices.

These and other purposes of the invention will be apparent from the specifications taken in conjunction with the drawings in which.

Figures 1, 2, 3, 4, 5:
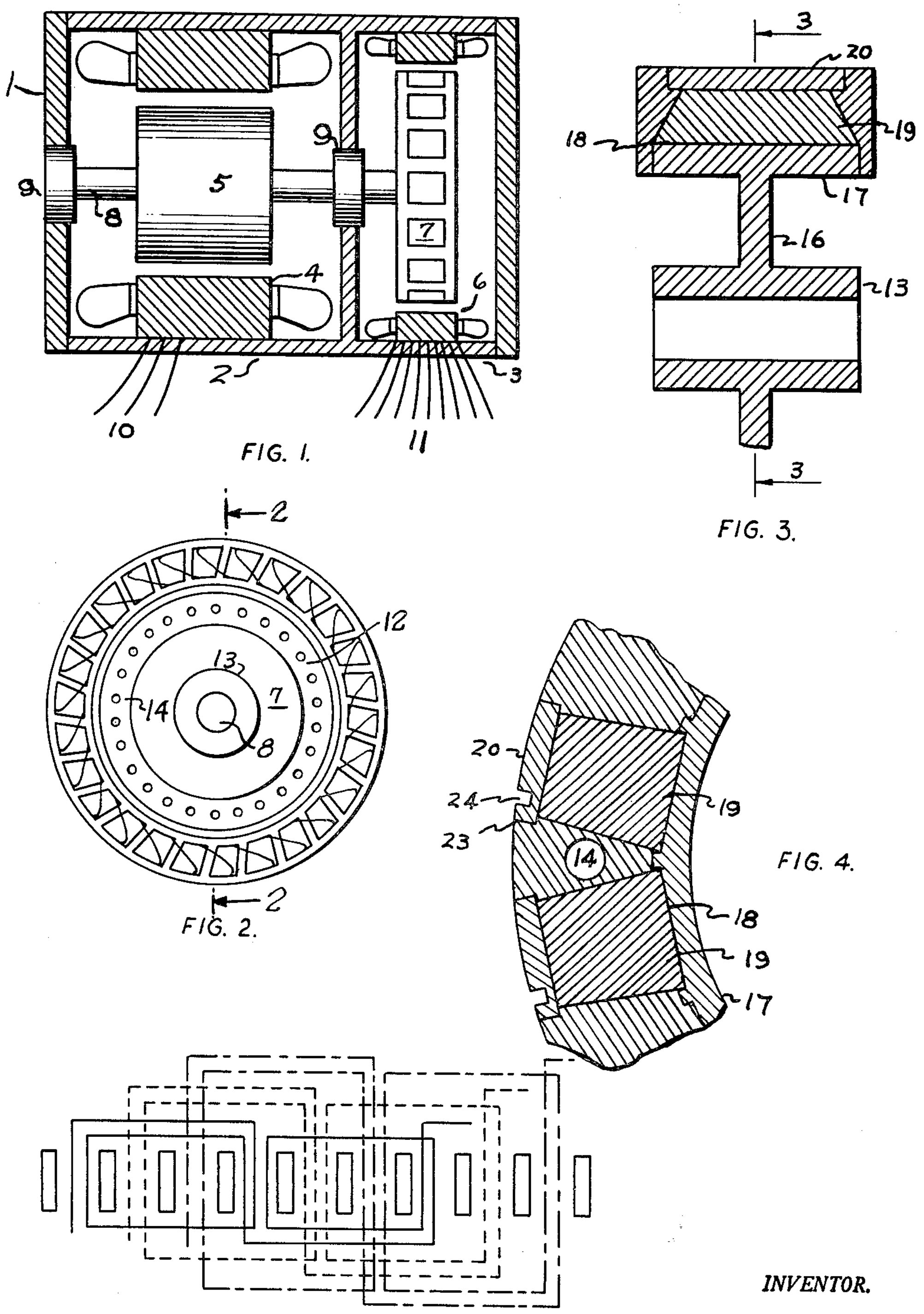
FIGURE 1 shows a cross-sectional view of a complete motor-generator frequency converter according to the invention.
FIGURE 2 shows an end view of the converter shown in FIGURE 1 viewed from the generator end.
FIGURE 3 shows a cross-sectional view of the rotor and stator of the generator shown in FIGURE 2, taken across the plane 2—2.
FIGURE 4 shows a partial cross-section of a portion of the rotor shown in FIGURE 3 taken across the plane 3—3.
FIGURE 5 shows a schematic view of the armature windings utilized in the generator shown in FIGURE 2.

Referring now particularly to FIGURE 1, 1 shows a complete motor-generator assemblage. This consists of a two-part housing, element 2 being the motor portion and 3 the generator portion. Within portion 2 is a motor stator 4 and free to rotate therein, a motor rotor 5.

The motor may be of any of the types familiar in the art. Thus it may be a direct current type, single phase alternating current, 2 or 3 phase alternating current, etc. A preferred type for most applications will be the conventional squirrel-cage type of 3-phase induction motor.

Within housing 3 is a generator stator 6 and free to rotate therein, generator rotor 7. A shaft extends through and is rigidly attached to rotors 5 and 7 respectively and rests in bearings 9 and 10 respectively. Connection is made to the motor for energisation thereof through leads 11. The output of the generator portion is delivered through leads 11. The energisation of motor 2 will cause rotation of shaft 8 and consequent rotation of rotor 7 within stator 6. This will generate electric power to be delivered through leads 11.

The detail of the generator portion is further shown in FIGURE 2. Although many of the features of the invention may be attained with generators of electro-magnetically excited types, the particular type to be described herein will be one utilizing permanent magnets for excitation. The rotor 7 of this machine is constructed about a wheel-like member with an outer periphery of a ferromagnetic material. A preferred form consists of a hub portion 13 which fits upon shaft 8, attached by means of a web or spokes 16 to rim 17. The material of rim 17 may be mild or wrought steel, wrought iron, cast steel or a grade of malleable iron of the general type known as "Magtiz." The portions 13 and 16 need not be of the same material, although it has been found convenient to construct the wheel portion 7 of a single casting or forging of the shape shown. Mounted upon machined surfaces 18 on rim 17 are a plurality of magnets 19. In the type of construction shown, each magnet defines a pole. The machine may therefore have a minimum number of 2 magnets or may have any desired larger number, depending upon the frequency desired and the rotational speed to be used. In the particular example shown, 28 magnets are utilized with a rotational speed of 3600 r.p.m., yielding 840 cycles.

The magnets 19 are of a form different than those heretofore used, being of frusto-pyramidal form with the broadest portion mounted facing the center of the rotor 7. The reasons for the selection of the form described will be treated further herein.

Resting upon magnets 19 are pole pieces of ferromagnetic material 20. These are generally of highly permeable material such as silicon steel and may be made of a solid piece of steel or of a series of silicon steel laminations resting edgewise upon the magnets and fastened together so as to constitute an integral pole piece. The pole pieces 20 are preferably made with sharply defined corners 23 and also with slots 24 cut into the surface of the pole face. The purpose of the sharp corner 23 and the slot 24 is to introduce harmonics into the generated wave.

After preliminary assembly of elements 16, 19 and 20, molten aluminum alloy is cast around the peripheral part of the structure and allowed to solidify. After solidification, the rotor may be finally machined to dimension and provided with balancing holes 14, between each pair of magnets 19, 19.

The magnets 19 may be made of cast Alnico magnet material, cobalt steel, or any of the other commonly available permanent magnet materials.

In the specific example shown a strongly magnetic permanent magnet material is utilized. However, with a leading power factor load, such as met with in a fluorescent lamp and capacitor ballast arrangement, a weakly magnetic permanent magnet material or even ordinary steel or iron, may be used for magnets 19.

Balancing of the rotor 7 to correct the inevitable misdistribution of weight therein and to prevent vibration, is effected by placing heavy slugs such as lead within the balancing holes 14.

The conventional methods of balancing by drilling out material are not suitable for use with this structure, since the aluminum being a light material, will require removal of an undue amount in order to effect balance. Removal of such amounts will seriously weaken the rotor structure since its strength is greatly dependent upon the strength of the cast aluminum.

The use of the tapered magnets 19 in the manner shown permits the casting or drilling of larger balancing holes 14, without weakening or endangering the strength of the cast aluminum portion 12. Balancing slugs may be placed toward either edge of the rotor 7 in order to effect dynamic as well as static balance.

The taper of the magnets as shown has been found to yield superior results in many respects. It has been common in the art to provide individual magnets for the purpose described of parallel form such as rectangular blocks or with a taper facing inwardly and having the larger base portion at the periphery, rather than toward the mounting structure of the rotor. In contradistinction, in the present invention, the broader portion of the magnet rests against the flange. One consequence of the use of the tapered magnet has already been mentioned, namely making possible the enlargement of balancing hole 14. Another advantage resides in the physical strengthening of the rotor. After the casting of the molten aluminum, during solidification thereof the aluminum will shrink. This will cause it to exert a compressive stress inward upon the elements cast therein. Since the magnets have tapered sides, the result of this stress will be to press the magnets more tightly against the rim 17 and thus hold the magnet in tight magnetic contact with said rim 17. The centrifugal stress on the magnet due to rotation of the rotor will be resisted by the aluminum cast therearound. In effect, the aluminum will have a tapered pocket in which each magnet rests and the centrifugal force will have the effect of pressing the magnet in up against the tapered pocket, the latter being a particularly effective form for resisting such stress.

A still further advantage of the tapered form of the magnet will be seen to follow from the magnetizing process that is utilized for magnetizing magnets 19 after assembly in the rotor 7. The magnetizing fixture consists of a removable horse-shoe shaped member 21, the faces of which are machined to be in close contact with the pole faces 20—20. The coil 22 serves to energize horse-shoe member 21 and to cause establishment of a magnetic flux therein. A high value of the direct current is passed through coil 22 and a high value of magnetic flux is thereby set up in the magnetic circuit composed of member 21, pole faces 20, magnets 19 and rim 17.

It will be seen that in the magnetizing process, useful lines of force such as (a) will pass through the entire structure, while non-useful or parasitic leakage lines of force (b) will pass through the air between magnets 19, 19. These will not serve to magnetize the magnet and in any event will not magnetize it in the direction desired. The closer the flanks of the magnets 19, 19, the greater will be the leakage and the greater robbing of the useful flux utilized for magnetization. The tapered form of the magnet reduces the leakage flux by increasing the distance between the sides of the magnets. Magnetization is therefore improved.

Figure 10:
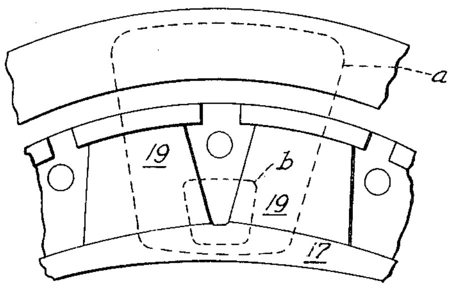
FIGURE 10 shows the magnetic lines of force due to the magnets in FIGURE 4.

Superior performance during operation also results from the use of the tapered magnets. Thus, as shown in FIGURE 10, the flux produced by the magnet passes through pole pieces 20 and into the armature 15. However, parasitic lines of leakage flux also exist between the magnets and serve to reduce the total amount of the useful working flux. By tapering the magnet distance between the faces is increased and the leakage factor reduced.

A still further advantage of the tapered form, where very hard magnetic materials of the type of Alnico must be utilized, and such materials are cast, is that the tapered form makes it much easier to mold and draw the castings from the mold.

Figure 11:
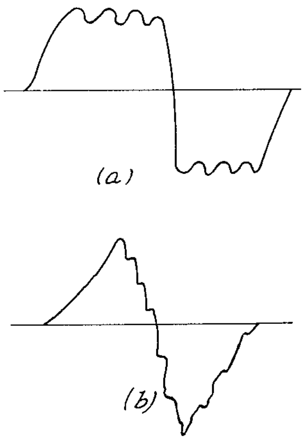
FIGURE 11 shows an oscillogram of the wave form obtained with the generator shown in FIGURE 2.

In operation of high frequency fluorescent lighting systems, it has been found that the performance improves the higher the frequency, up to frequencies of the order of 20,000 cycles. However, as one proceeds above 400 cycles, the obtaining of substantial amounts of power economically becomes more and more difficult. A practicable frequency, in the particular example described herein is 840 cycles. However, it is desirable to have the advantages of still higher frequencies, and this is obtained to a considerable extent by superposing high frequency harmonics upon the fundamental 840 cycle wave. These high frequency harmonics have been obtained in the present instance by the shaping and slotting of the pole faces as shown in FIGURE 4, by eliminating the skew in the stator structure customarily used, and by utilizing a winding as shown in FIGURE 5. The use of these expedients singly or in combination, will yield a wave form with a high percentage of harmonics as shown in FIGURE 11, FIGURE 11(*a*) representing the oscillogram of the wave form at light load and FIGURE 11(*b*), the wave form at substantial load.

It has also been found that the conducting or amortisseur bars placed customarily in the pole faces 20, may be omitted with a consequent increase in the generated harmonic content.

FIGURE 5 shows the winding pattern used for the stator 6 of the generator. The stator may, for example, have 84 slots. The winding pattern for each of the independent phases is shown. It will be seen that each coil spans three slots and that the coil sides for adjacent coils lie in the same slot. The phases are displaced by one tooth. The windings for each of the three phases are identical. A tap is brought out from the fourteenth coil of each phase. This is for the neutral or ground connection 26 mentioned herein. Except for the common ground neutral connection, the phases are electrically independent.

Use of the winding described has been found to yield a large percentage of odd harmonics, particularly the third harmonic. This is advantageous, as further detailed herein.

Figure 6:
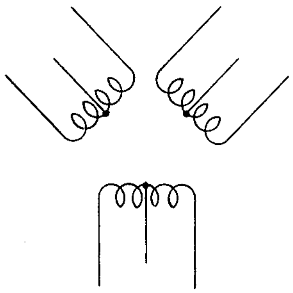
FIGURE 6 shows the connection diagram for the interconnection of the armature coils shown in FIGURE 5.

The connection diagram for the generator is shown in FIGURE 6.

Figure 7:
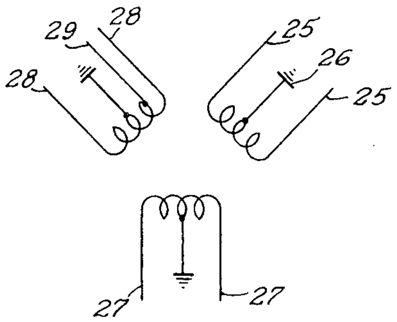
FIGURE 7 shows a wiring diagram of the armature as presented to the external circuit.

FIGURE 7 shows the wiring diagram of the generator as presented to the external load. It will be seen that three individual windings are provided, each displaced in phase relationship from the other. Although 3 phases are shown, any number of phases, either one or a plurality may be utilized, without departing from the spirit of the invention. A 3-phase arrangement is shown, because 3-phase generators are most usual. Each of the coils has terminals 25, 25 and a center tap 26 which is grounded, thus connecting the center points of all coils to a common terminal and to ground. The advantage of this is that no point in either the generator or external circuit is more than half the total voltage above ground potential. The voltage between terminals 28—28 may be, for example, 400 volts or 600 volts. The voltage across terminals 27—27 and 25—25 may have the same value as the voltage across terminal 28—28. Alternatively, where it is desired to use fluorescent lamps of different lengths, each with different voltage requirements, the voltage between terminals 28—28 may for example, be 600 volts and that between 27—27, for instance, 400 volts. Due to the structure of the generators described herein, the application of load to one pair of terminals, for example 28—28, will have relatively little effect on that produced by load on terminals of another phase, 27—27. The elimination of a regulator as further described herein, makes it possible to wind the machine to produce different voltages from each phase without interference with each other.

As a still further alternate, a tap 29 may be placed in any of the windings. The voltage then obtained may be either that between either of terminals 28 and 29 or between the ground terminal such as 26 and the terminal 29. This feature is especially valuable where there are to be utilized only a few lamps employing a different voltage than that of the majority of lamps utilized in the system.

Alternatively, a tap such as 29, may be utilized for monitoring or control purposes or for the operation of auxiliary devices other than lamps.

Figure 8:
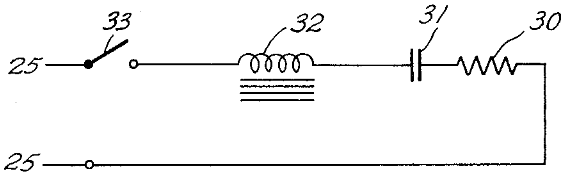
FIGURE 8 shows a typical external circuit including a fluorescent lamp and its auxiliaries, suitable for connection to the generator shown in FIGURE 2.
Figure 9:
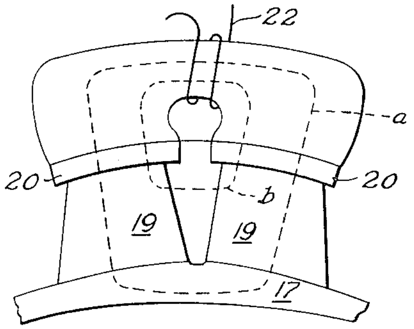
FIGURE 9 shows the method of magnetization of the magnets shown in the portion of the rotor structure pictured in FIGURE 4.

A typical circuit employing fluorescent lamps is shown in FIGURE 8. Here terminals 25, 25 are the leads from one phase of the generator. A switch 33 controls the flow of current in this circuit, and for the sake of generality a choke 32, a condenser 31 and a resistance equivalent to the dissipative load of the lamp 30, are represented in series.

FIGURE 8 may be taken to represent not merely one lamp but a series of lamps and their equivalent circuit.

For the sake of economy, a capacitor ballast 31 is utilized to limit the current flowing in the lamp 30. The value of capacitor 31 will depend upon the frequency generated by the generator, the harmonics present therein, the voltage of the generator and the current that is desired to flow through the lamp 30.

In order to effect economy in the wiring, switches and the converter unit itself, it is desirable to correct or partially correct the leading power factor due to the lamp 30 and the capacitor 31. The net power factor of this combination is usually of the value of 30% leading. The choke coil 32 may be placed in series with each individual capacitor, but is preferably used in series with or parallel across the circuits comprised of a number of lamps and their respective capacitor ballasts 31.

It has been found with the generator described, that the regulation; i.e. the change in voltage upon application of load can be brought to a low figure, very near zero, by adjusting the power factor presented to the generator to a value of approximately .85 leading. With such power factor, due to the construction of the generator and the relatively constant rotational speed due to the induction motor operated from a constant frequency supply line, the voltage will remain very stable, not varying by more than about plus or minus 2%. This is achieved without the use of any auxiliary regulating equipment.

The preferred method of adjusting power factor in a circuit of the type shown in FIGURE 8, is to adjust the value of choke 32 until a net leading power factor is obtained, corresponding to that figure for which the generator will have a minimum regulation or a regulation within the desired voltage tolerance.

For example, plus or minus 5% may be tolerated in the output voltage. It is then necessary only to correct the power factor to such a value that the net change in voltage will be no greater than plus or minus 5%.

This procedure makes it possible to utilize a smaller choke than would otherwise be necessary, with consequent economy in first cost and in operation. It also makes it possible to avoid entirely the correction of circuits containing only a few lamps, since the overall effect of their load and power factor on the entire system, will be so small as to be neglected. The use of a wave with a high percentage of harmonics makes the choke more effective than it would be for the fundamental frequency alone and therefore permits a still further reduction in the size of the choke.

Still further features of construction which make it possible to reduce the size of the choke, and in some cases to eliminate it altogether, are given below:

If the motor 2 in FIGURE 1 is chosen so as to show a great speed drop with application of load, in other words, to have a high slip, if an induction motor, the application of load will cause a reduction in the speed of the generator 3, which will have the effect of reducing the terminal voltage and also reducing the frequency. Both of these effects will tend to reduce the voltage applied across the circuit shown in FIGURE 8 and will tend to reduce the voltage and current through lamp 30. However, the load imposed by the lamp 30 with its capacitor 31 is leading in character and a leading load of the magnitude and power factor noted above, has the effect of raising the terminal voltage of the generator. Thus, the terminal voltage increasing effect and the terminal voltage decreasing effect due to slowing down of the motor and generator, will tend to oppose each other and to tend toward a constant voltage condition. This, as noted above will make it possible to reduce the size of the choke and in some cases to eliminate it altogether.

A still further correcting circumstance occurs in the case of the wave form. The effect of the capacitor load of the type described, will be to suppress the harmonics and to leave a wave with the greater proportion of the fundamental. Since the capacitor 31 will tend to pass the high frequency components more readily than the lower frequency, the removal of these high frequency components or the reduction of their percentage will cause a reduction in the net current flowing through the lamp 30.

At the same time, the application of the leading load to the generator will tend to cause an increase in the terminal voltage of the generator. This tendency to increase voltage and thus increase the current through the lamp 30 will at the same time be counterbalanced, at least in part, by the reduction in the harmonics as noted above.

Any of the expedients noted above tending toward the maintenance of the constant voltage condition may be used singly or in any combination. They will in all cases, tend toward achieving the ideal of a constant current through lamp 30, regardless of the total load in the system.

Where a direct current motor is utilized for the driving means in FIGURE 1, a governor may be utilized on the shaft of the motor, or other speed sensitive devices may be utilized, in order to maintain relatively constant speed. Alternatively, the speed control device may be selected so as to have a droop suitable for correction of the voltage increase which tends to be caused by the application of the leading load on the generator.

The rotating system composed of rotor 7 of the generator and rotor 5 of the motor on shaft 8, will have a high moment of inertia, particularly since the rotor 7 is in the shape of a fly wheel. This will tend to give the converter a stabilizing effect and to resist the effects of short period disturbances on the input supply lines. The latter are often caused by switching on or off of large motors.

Since with the usual type of induction motor, the input voltage has relatively little effect on the operating speed, the converter as shown will be quite insensitive to voltage changes on the input supply line. The output voltage will, in general, tend to remain more constant than the input voltage, so that a high quality of lamp operation may be obtained from a low quality of supply.

The use of the correction systems noted above will avoid the use of complex and delicate regulating auxiliaries. Since the converter described is intended for use in localities where skilled personnel are not ordinarily available for maintenance of delicate and complex equipment, the elimination of such equipment and the necessity therefor is an important step in the more widespread use of the high frequency systems.

Where alternating current is utilized for the drive of the motor 2, no brushes will be required in the motor and since the generator portion likewise does not utilize brushes, the installation may be made explosion-resistant or explosion-proof.

A plurality of converter units as shown in FIGURE 1 may have their outputs connected in parallel. For such purpose, the internal impedances of the generator portion of the machines are made nearly identical and the terminal voltage for a given condition of load are made nearly identical. The machines may then be interconnected in parallel so as to share the load when the latter becomes too great for one machine to handle alone.

As an alternate, the motors 2 may be synchronous motors, particularly brushless types of synchronous motors. If the stators 6 of the generators are all arranged so as to bear the same angular relation to the stator 4 of their respective motors, the outputs of the generators may then be connected in parallel, since they will always be in the same phase relationship and will remain so due to the constant speed characteristics of the synchronous motors.

As will be obvious to those skilled in the art, the features of construction of the converter units may be applied singly or in any combination or may be applied to purposes other than the operation of high frequency fluorescent lighting systems.

The principles of matching of load and converter or load and generator may be applied to loads other than those due to fluorescent lamp and their auxiliaries.

The scope of the invention is indicated by the appended claims.

What is claimed is:

1. In a generator for generating high frequency power, a polyphase winding the extremities of each phase of said winding being connected to output terminals for delivery of high frequency power directly to the load, each phase delivering a frequency identical with that of the other phases, the extremities of each phase being independent of and not connected to the extremities of other of the phases, at least one of said phases being wound to deliver a voltage at the respective terminals thereof different from the voltage delivered at the terminals of other of the said phases and a salient pole permanent magnet field structure rotatable relative to said windings to generate voltage therein.

2. A generator as in claim 1, having a skewless stator structure and transverse slots in the said salient poles, whereby a substantial proportion of harmonics will be generated within each of said phases.

3. A generator as in claim 1, in which each phase winding is provided with a connection intermediate the terminals thereof and said intermediate connections are interconnected and grounded to the frame of said generator.

4. A generator as in claim 1, in which each phase winding is provided with a connection intermediate the ends thereof, all of said intermediate connections being interconnected and further connected to ground and at least one of said windings is provided with an additional connection, located at a point on said winding different from said intermediate connection, whereby a desired output voltage lower than that delivered by the full winding relative to ground may be attained.

References Cited by the Examiner

UNITED STATES PATENTS

| | | | |
|---|---|---|---|
| 2,066,123 | 12/1936 | ReQua | 322—93 |
| 2,190,887 | 2/1940 | Schaeren | 310—127 |
| 2,745,029 | 5/1956 | McElligott | 310—202 |

FOREIGN PATENTS

| | | |
|---|---|---|
| 730,512 | 5/1955 | Great Britain. |

LLOYD McCOLLUM, *Primary Examiner.*